W. KURLBAUM.
FLY TRAP.
APPLICATION FILED AUG. 15, 1910.
993,844.
Patented May 30, 1911.
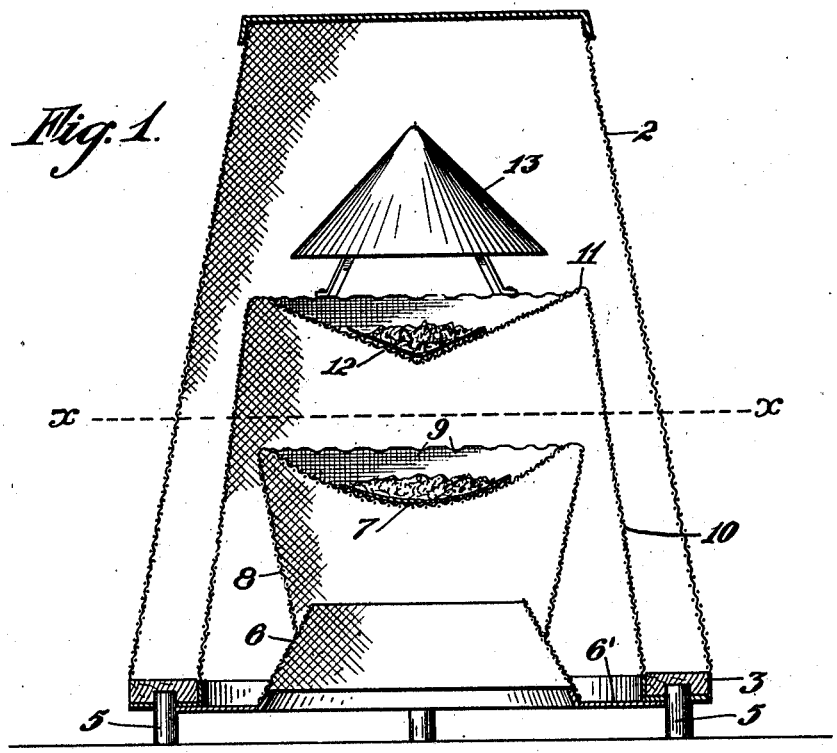
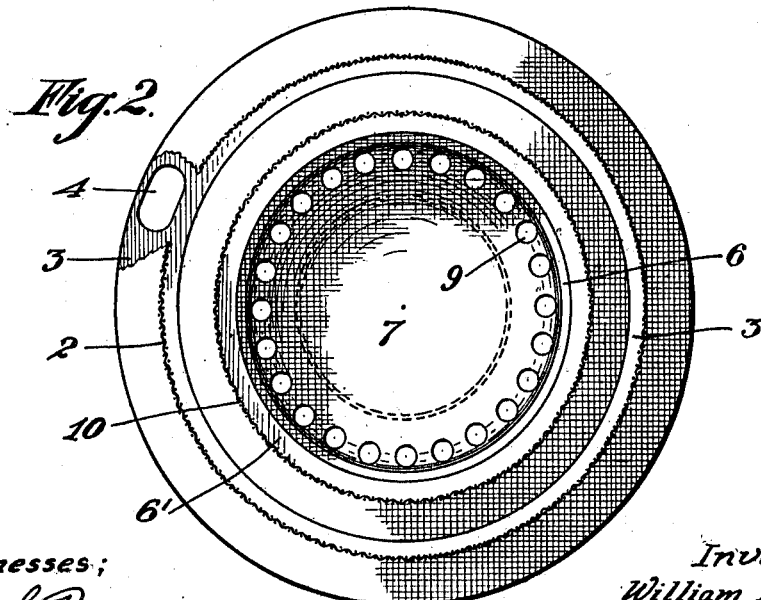
Witnesses:
R. S. Berry
Thos. Eastberg
Inventor
William Kurlbaum
By Geo. H. Strong.
His Attorney.

UNITED STATES PATENT OFFICE.

WILLIAM KURLBAUM, OF VINA, CALIFORNIA.

FLY-TRAP.

993,844. Specification of Letters Patent. Patented May 30, 1911.

Application filed August 15, 1910. Serial No. 577,291.

*To all whom it may concern:*

Be it known that I, WILLIAM KURLBAUM, citizen of the United States, residing at Vina, in the county of Tehama and State of California, have invented new and useful Improvements in Fly-Traps, of which the following is a specification.

This invention relates to traps and pertains especially to fly traps.

The object of the invention is to provide a simple, inexpensive, reliable and capacious device for the entrapping of insects, especially flies.

The invention consists of the parts and construction and combination of parts as hereinafter more fully described and claimed, having reference to the accompanying drawings, in which—

Figure 1 is a vertical sectional view. Fig. 2 is a transverse section of the trap.

The present embodiment of my invention comprises an outer conical shell 2 of the trap closed at the top and being secured at its base to a ring 3 which may be of wood, metal or any other desirable material. The ring 3 is sufficiently wide to form an annular floor for the reception of dead insects, and is provided with an aperture 4 whereby the same may be removed at requisite intervals. The bottom or ring 3 of the trap may be elevated a sufficient height from the floor by means of small feet 5, leaving a space of sufficient height to allow flies to pass inwardly under the bottom of the trap and thence upwardly into a cone 6, having a flared crown 8. A particular feature of this form of egress into the trap is that a very large area is presented over which the flies may travel with relative freedom after passing below the annular elevated floor of the trap 3. Having gained access to the interior of the cone 6, and being attracted by suitable material deposited in a pocket 7 formed by depressing the apex of the flared crown downwardly, the flies gradually work their way toward the material, and being baffled in their attempt to reach this by the wall of the pocket 7 will naturally pass upwardly through the crown 8 of the cone 6, this crown being perforated with a number of suitably sized holes 9.

The multiplicity of ingress openings 9 of the crown 8 of the entrapping cone 6 is a particular feature in that, in the event of the flies being very numerous, and should there be only one inlet aperture in the fly cone, the ready access to the interior of the trap by the flies would naturally render their being captured slower than is the case in my trap by reason of the large number of ingresses 9.

In order to further prevent the possible return of the entrapped flies outwardly again through the cone 6, I have provided an auxiliary or inner trapping cone 10 of suitable size and shape, the base of which is co-jointly secured with the flanged bottom 6' of cone 6 to the interior surface of the bottom ring 3. Therefore, after a fly has once passed through the perforations 9, it is then restrained in the space formed between the lower cone 6 and the upper cone 10, and from this space it may pass into the body of the cage or trap 2 through a plurality of perforations 11 formed at the ridge of the truncated cone 10. This cone also has its top depressed to form an inverted cone or pocket 12 in which also may be placed some suitable fly attracting substance.

It will be seen then that by my construction a number of flies may simultaneously pass through the lower ingress apertures 9 of the lower cone 6 and others may also pass simultaneously through the upper series of apertures 11 of the second cone 10, thus increasing the efficiency of the trap to that extent and further by forming a double set of constricted apertures through which the flies enter the cage 2, the possibility of their return is removed. Were only one aperture provided at the apex of one of these cones, the lodgment of a single fly in the aperture would immediately render the trap useless, until the dislodgment of the fly. Thus the provision of the plurality of the ingresses is an important advantage. I have found that after flies have once passed through the perforations 9, they are disinclined to again approach them for some reason, and in order to prevent, however, their possible return to the crown of the cone 10, I support at a slight distance above this crown a small dome or perch 13, and the flies do not hesitate in moving about within the cage 2 to alight upon this perch 13 in preference to approaching the apertures 11. This provision not only serves the purpose of preventing the flies from attempting to repass the apertures 11, but also in keeping them away, leaves the apertures free for the entrance of incoming flies.

The lower cone 6 may be dispensed with entirely if so desired, and only the inner larger trap-cone 10 used in conjunction with the case 2.

The flange 6' of the lower cone is preferably made of such diameter that it will snugly abut the supports 5 with sufficient pressure to secure itself to the bottom of the ring 3, and may be disconnected therefrom by simply disengaging the flange 6' from the legs 5.

Having thus described my invention, what I claim and desire to secure by Letters Patent is—

A trap comprising concentric, truncated cones, an annular ring forming a base, to the inner and outer surfaces of which are attached the bases of said cones, a depressed, integral crown on the inner cone, a cover for the outer or cage cone, a plurality of legs projecting from and elevating the ring and beneath which access may be had into the trap, and an outwardly flared snare having a flange frictionally engageable with the supporting devices of the ring, said snare being provided with a plurality of perforations allowing ingress to the inner crowned cone, said concentric cones forming an annular chamber immediately above the base ring.

In testimony whereof I have hereunto set my hand in the presence of two subscribing witnesses.

WILLIAM KURLBAUM.

Witnesses:
CHARLES A. PENFIELD,
CHARLES EDELMAN.

Copies of this patent may be obtained for five cents each, by addressing the "Commissioner of Patents, Washington, D. C."